S. H. MARTIN & J. S. WILLIAMS.
Improvement in Bread-Cutters.
No. 126,468. Patented May 7, 1872.
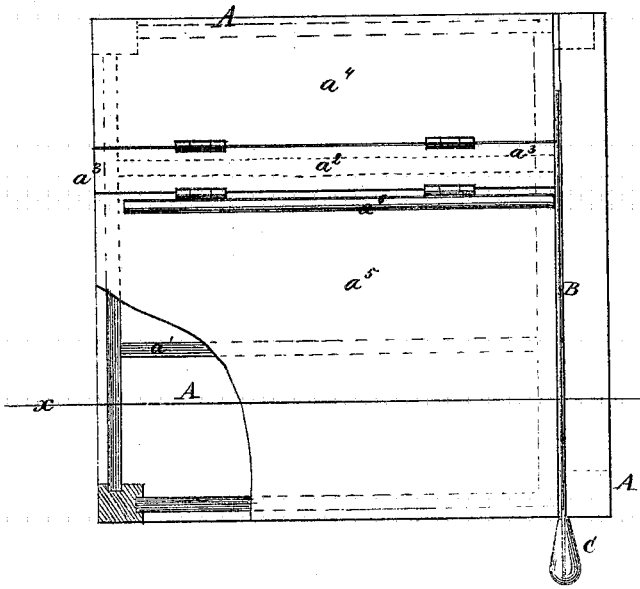
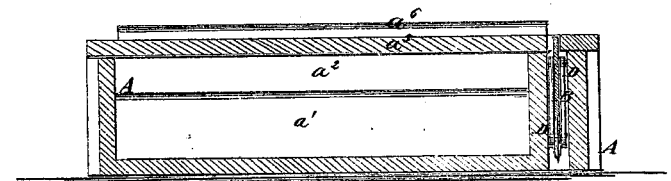
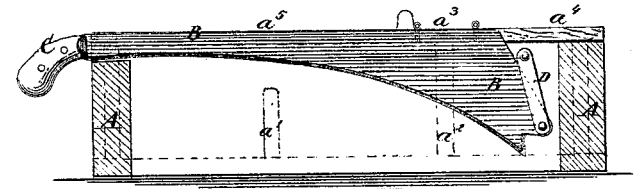
Witnesses:
A. W. Almqvist
Francis McArdle
Inventor:
S. H. Martin
J. S. Williams
per Munn & Co
Attorneys.

UNITED STATES PATENT OFFICE.

SAMUEL H. MARTIN AND JOHN S. WILLIAMS, OF MOUNT VERNON, NEW YORK.

IMPROVEMENT IN BREAD-CUTTERS.

Specification forming part of Letters Patent No. 126,468, dated May 7, 1872.

Specification describing a new and Improved Combined Bread-Cutter and Box, invented by SAMUEL H. MARTIN and JOHN S. WILLIAMS, of Mount Vernon, in the county of Westchester and State of New York.

Figure 1 is a top view of our improved device, part being broken away to show the construction. Fig. 2 is a detail sectional view of the same taken through the line $x\,x$, Fig. 1. Fig. 3 is a detail sectional view of the same taken through the line $y\,y$, Fig. 1.

Similar letters of reference indicate corresponding parts.

Our invention has for its object to furnish an improved bread-cutter, simple in construction and effective in operation, enabling the freshest and softest loaves to be easily and smoothly cut, and which may be also used to contain knives, forks, spoons, napkins, napkin-rings, or other articles required about a table; and it consists in the construction and combination of the various parts of the device, as hereinafter more fully described.

A is a rectangular box, which is divided into three compartments by partitions $a^1\,a^2$. The rear partition $a^2$ extends up to the top of the box, and to its upper edge is attached a narrow board, $a^3$, to the edges of which are hinged the covers $a^4$ and $a^5$. To the cover $a^5$, near its rear or hinged edge is attached a flange, $a^6$, to rest the loaf of bread against while being cut. In one side of the box A is formed a narrow compartment to receive the knife B, the edge of which is concaved, as shown in Fig. 3. To the forward or free end of the knife B is attached the handle C, by which it is operated. The rear end of the concave edge of the knife B is made with a sharp angle, which may be forced through the crust in beginning the cut. The rear end of the knife B is made wide, and to the opposite sides of its lower part are pivoted the lower ends of two short parallel bars, D, the upper ends of which are pivoted to the sides of the boards that form the knife compartment or slot, near their upper edges, as shown in Fig. 3. This construction gives the knife B a free movement, enabling it to operate upon the board with a drawing cut.

The device may also be used for shaving dried beef, which may be cut readily and quickly by giving the knife a sawing movement.

Having thus described our invention, we claim as new and desire to secure by Letters Patent—

The combination of rectangular box A, divided into three compartments, the covers $a^4$ $a^5$ having loaf-rest $a^6$, the concave knife B having handle C, and the pivoted bars D, all constructed and arranged as and for the purpose described.

SAML. H. MARTIN.
JOHN S. WILLIAMS.

Witnesses:
A. H. DUNCOMBE,
JAMES FITZPATRICK.